No. 833,815. PATENTED OCT. 23, 1906.
M. WILLIAMS.
FERTILIZER DISTRIBUTER.
APPLICATION FILED JUNE 14, 1906.
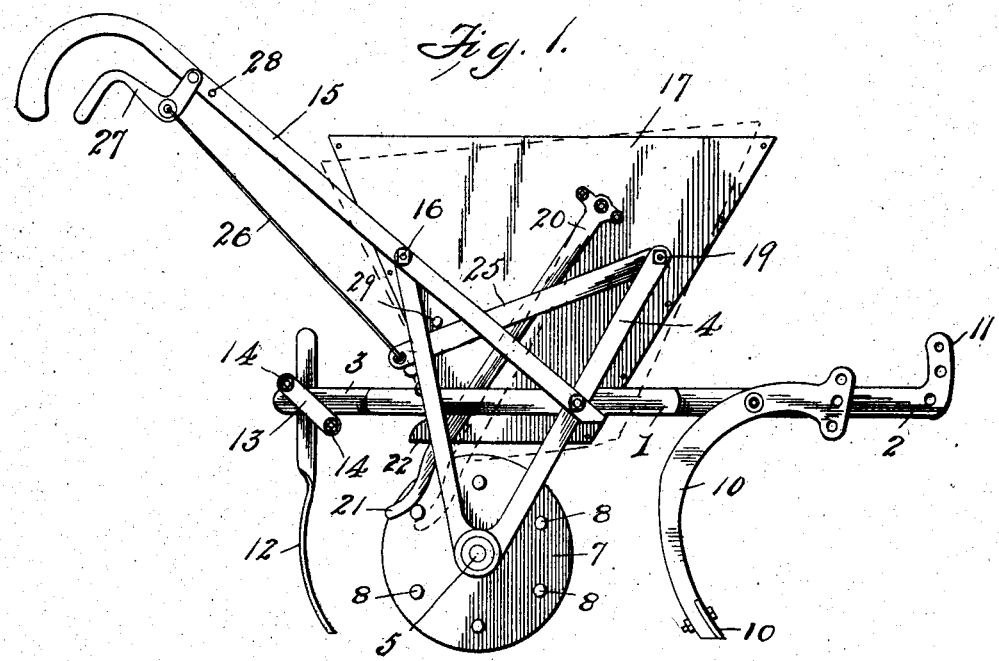
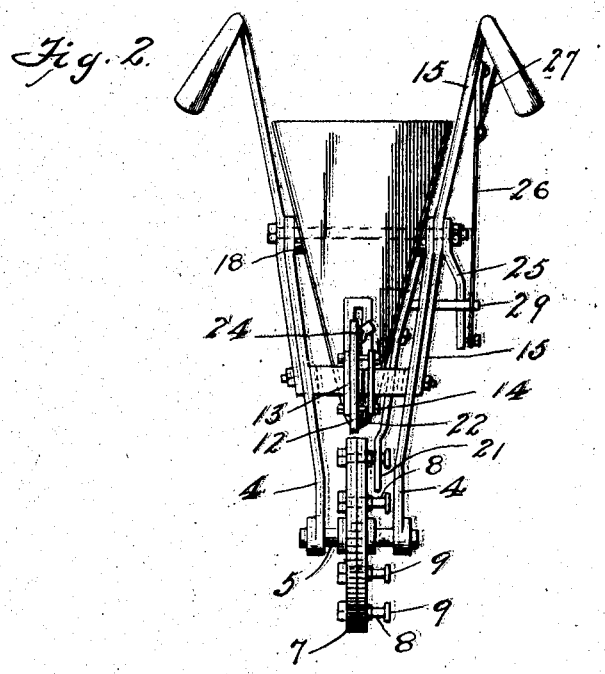
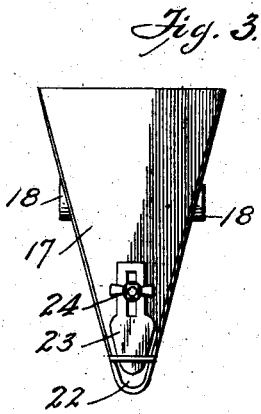
Witnesses
Chas. K. Davies
John S. Powers
Inventor
Matt. Williams
By Shepherd Parker
Attorneys

UNITED STATES PATENT OFFICE.

MATTHEW WILLIAMS, OF SENECA, GEORGIA.

FERTILIZER-DISTRIBUTER.

No. 833,815.          Specification of Letters Patent.          Patented Oct. 23, 1906.

Application filed June 14, 1906. Serial No. 321,679.

*To all whom it may concern:*

Be it known that I, MATTHEW WILLIAMS, a citizen of the United States, residing at Seneca, in the county of Telfair and State of Georgia, have invented certain new and useful Improvements in Fertilizer-Distributers, of which the following is a specification.

This invention relates to new and useful improvements in fertilizer-distributers, and contemplates a construction in which an oscillating or vibrating hopper positively actuated from the traction-wheel to discharge its contents is employed.

It is a primary object of the present invention to provide means, in connection with an apparatus of the above type, for turning the ground in the movement of the apparatus thereover to insure a thorough mixing therewith of the fertilizing material.

It is a further object of the invention to provide a device which shall be simple and inexpensive to manufacture, strong, and practical.

It is a further object of the invention to provide a device which is so constructed as to adapt itself to a number of uses.

To this end the apparatus embodied in the present invention is capable of use equally as advantageously as a fertilizer-distributer or as a seed-distributer.

The detailed construction will appear in the course of the following description, in which reference is had to the accompanying drawings, forming a part of this specification, like numerals designating like parts throughout the several views, wherein—

Figure 1 is a side elevation illustrating an apparatus constructed in accordance with the present invention. Fig. 2 is an end view thereof from the rest, and Fig. 3 is a detailed end view of the hopper.

In the practical embodiment of my invention, I employ an elongated frame 1 of substantially rectangular outlines, which carries a forward extension 2 and a rearward extension 3. Rigidly secured at each side of the frame 1 are substantially V-shaped hangers or brackets 4, having their apices extending downwardly and apertured for the reception of an axle or shaft 5, carrying the traction-wheel 7 therebetween. The apparatus and the operating parts thereof are suspended from the hangers 4 and are operated from the wheel 7. For the sake of simplicity of construction the wheel 7 is constructed of a pair of boards of stout wood, suitably secured together and having their respective grains extending at right angles, so as to prevent warping. The wheel 7 is provided with a plurality of outstanding horizontal studs 8, severally terminating in enlarged heads 9 and designed for engagement with devices for vibrating the hopper. Adjustably secured to the forward extension 2 of the frame 1 is a depending plow standard 10 and blade 10'. The extension 2 terminates in an apertured hook 11 for the reception of the draft apparatus. A plow-standard 12 of any form approved for the purpose is secured to the rearward extension 3 and is designed to turn the soil over after the discharge of the fertilizing material to insure a thorough mixing of the same with said soil. The standard 12 is adjustable to any desired extent by virtue of inclined retaining-links 13, passing on each side thereof and secured to each other by transverse connecting-bolts 14. The frame 1 in the preferred embodiment of the invention is constructed of a pair of bars extending in approximately parallel planes and secured to one another at their meeting points. Secured to each of the bars of the frame are handle members 15, which are secured, as at 16, to the upper end of the rear leg of the hanger 4. A hopper 17, provided with apertured bosses 18, is pivotally mounted between the forward legs of the hanger 4 by means of pins passing through the upper ends of said legs and through said bosses 18, as at 19.

Rigidly secured to one side of the hopper 17 is a depending lever 20, arranged in an inclined plane and terminating in a curved lower end 21, disposed in the path of the studs 8 as they move with the wheel 7. The hopper 17 terminates at its base in a rearwardly-extending spout 22, through which the feed of material is adjusted by a sliding gate 23, which is locked in any selected position by means of a set-nut 24, operating in a well-known manner. The hopper 17 has a two-point suspension at its pivot 19 and again at the point of engagement of the lever 20 with any one of the studs 8 which may be adjacent thereto. This suspension may be changed when it is desired to throw the hopper out of operative position by the provision of a hopper-raising mechanism comprising an arm 25, pivoted at one end at 19 in common with the hopper and having pivotal connection at its other end with a rod 26 in turn pivoted to the hand-lever 27, fulcrumed upon one of the handles 15 and having its throw limited by a stop-pin 28, carried upon said handle. The arm 25 engages a laterally-extending pin 29, mounted upon the side of the hopper 17.

In practical use the parts are disposed as shown in Fig. 1. The plow carried upon the standard 10 breaks the soil as the apparatus moves over the ground, and as the studs 8 engage the curved end 21 of the lever 20 the hopper 17 is rocked or vibrated upon its fulcrum 19 between the full and dotted line position shown in Fig. 1. The constant vibration of the hopper jars the material contained therein, so that it passes through the spout 22 and drops by gravity upon the loose soil, which is turned by the plow 12 to insure a thorough mixing of said soil with the fertilizing material to the desired depth, according to the adjustment of the plow-standard 12 between the links 13. The feed of the material through the spout 22 is regulated, as above intimated, by the sliding gate 23. When it is desired to move the apparatus without discharging material from the hopper, the lever 27 is thrown rearwardly and through the medium of the connecting-link 26 raises the arm 25, which in turn engaging the pin 29 lifts the hopper upon its fulcrum 19 until the lever 20 is out of the path of the pins 8.

While the elements herein shown and described are well adapted to serve the functions set forth, it is obvious that various minor changes may be made in the proportions, shape, and arrangement of the several parts without departing from the spirit and scope of my invention as defined in the appended claims.

Having fully described my invention, I claim—

1. In a device of the type set forth a wheeled frame having a rectangular body portion, V-shaped hangers carried upon the side bars of said frame, a shaft transversely journaled between the apices of said hangers, a traction-wheel mounted upon said shaft, said traction-wheel being provided with a plurality of annularly-arranged laterally-extending studs on one side thereof, a hopper formed with a discharge-spout and pivotally supported between the forward upper ends of said hanger, and a rearwardly-inclined member carried by said hopper and having its free end supported upon the adjacent one of said studs and in the path of the remaining studs.

2. In a device of the type set forth a supporting structure comprising a wheeled frame having a rectangular body portion and V-shaped hangers carried upon the side bars of said frame, a shaft transversely journaled between the apices of said hangers, a traction-wheel mounted upon said shaft, said traction-wheel being provided with a plurality of annularly-arranged laterally-extending studs on one side thereof, a hopper formed with a discharge-spout and pivotally supported between the forward upper ends of said hanger, a rearwardly-inclined lever rigidly carried by said hopper and having its free end supported upon the adjacent one of said studs and in the path of the remaining studs rearwardly of the center of said traction-wheel, a rearwardly-extending member carried by said hopper, a movable element carried by said handle and a positive and rigid connection between said element and said member as and for the purpose set forth.

3. In a device of the type set forth a supporting structure comprising a wheeled frame having a rectangular body portion and forward and rearward extensions longitudinally central thereof, and V-shaped hangers carried upon the side bars of said frame, a shaft transversely journaled between the apices of said hangers, a traction-wheel mounted upon said shaft, a hopper formed with a discharge-spout and supported between the ends of said hangers, means for discharging material from said hopper through said spout and depending plows carried by said extensions forwardly and rearwardly of said hopper.

In testimony whereof I affix my signature in presence of two witnesses.

MATT. WILLIAMS.

Witnesses:
JOHN VEAZEY,
J. D. LOWE.